(12) United States Patent
Morita et al.

(10) Patent No.: US 8,354,848 B2
(45) Date of Patent: Jan. 15, 2013

(54) OBSTACLE DETECTING SYSTEM AND OBSTACLE DETECTING DEVICE

(75) Inventors: Keisuke Morita, Chiyodau-ku (JP); Akihiro Toyohara, Chiyoda-ku (JP); Kenji Inomata, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 403 days.

(21) Appl. No.: 12/748,735

(22) Filed: Mar. 29, 2010

(65) Prior Publication Data

US 2010/0244856 A1 Sep. 30, 2010

(30) Foreign Application Priority Data

Mar. 30, 2009 (JP) .................................. 2009-82400

(51) Int. Cl.
*G01R 27/32* (2006.01)
*G08B 13/18* (2006.01)

(52) U.S. Cl. ....................................... 324/639; 340/552
(58) Field of Classification Search .................. None
See application file for complete search history.

(56) References Cited

U.S. PATENT DOCUMENTS

| 6,424,289 B2 * | 7/2002 | Fukae et al. ..................... 342/27 |
| 2007/0285233 A1 * | 12/2007 | Inomata et al. ............... 340/552 |
| 2008/0252452 A1 * | 10/2008 | Aizawa ......................... 340/555 |

FOREIGN PATENT DOCUMENTS

| JP | 3-152697 A | 6/1991 |
| JP | 4-13991 A | 1/1992 |
| JP | 4-13992 A | 1/1992 |
| JP | 10-95338 A | 4/1998 |
| JP | 11-248827 | 9/1999 |

\* cited by examiner

*Primary Examiner* — Minh N Tang
(74) *Attorney, Agent, or Firm* — Buchanan Ingersoll & Rooney PC

(57) ABSTRACT

An obstacle detecting system having leakage coaxial cables laid on at both the sides of an obstacle monitoring district and an obstacle detecting device for emitting electrical waves from one of the leakage coaxial cables laid on at both the sides to the other leakage coaxial cable and detecting an obstacle in the obstacle monitoring district on the basis of the electrical waves incident to the other leakage coaxial cable is further equipped with an electrical wave transmitting unit for transmitting the electrical waves to the one leakage coaxial cable in the obstacle detecting device, an electrical wave receiving unit for receiving the electrical waves incident to the other leakage coaxial cable, and a connecting unit for connecting the electrical wave transmitting unit and the electrical wave receiving unit.

9 Claims, 13 Drawing Sheets

OBSTACLE DETECTING SYSTEM AND OBSTACLE DETECTING DEVICE

BACKGROUND OF THE INVENTION

1. Field of the Invention

The present invention relates to an obstacle (or intruder) detecting system and an obstacle (or intruder) detecting device for specifying an obstacle (or intruder) by emitting electrical waves from a leakage coaxial cable.

2. Description of the Related Art

In a conventional obstacle detecting device, leakage coaxial cables are laid on around an obstacle monitoring district (hereinafter referred to as "monitoring district"), and electrical waves are emitted from one of the leakage coaxial cables (hereinafter referred to as "first leakage coaxial cable") to the other leakage coaxial cable (hereinafter referred to as "second leakage coaxial cable") to detect an obstacle in the monitoring district.

A transmitter for generating a pulse-shaped signal (hereinafter referred to as "pulse signal") is connected to one end of the first leakage coaxial cable, and a receiver which receives a signal obtained through delay of the pulse signal in accordance with the position on the second leakage coaxial cable is connected to one end of the second leakage coaxial cable. The one end of the second leakage coaxial cable is located at the same side as the one end of the first leakage coaxial cable.

Furthermore, a filter for picking up the envelope curve of the signal waveform from the pulse signal received by the receiver is connected to the receiver, and there are provided a storage device for pre-storing the envelope curve of the signal waveform when no obstacle exists, and a computing unit for detecting the position of an obstacle on the basis of the differential waveform between the envelope curve when no obstacle exists and the envelope curve picked up from the filter.

As described above, the position of an obstacle intruding into the monitoring district is detected by receiving the pulse signal from the transmitter, and the magnitude of the differential waveform between the envelope curves is dependent on the power of the detection signal which is received by the second leakage coaxial cable and passes from the receiver to the computing unit. Therefore, it is a challenge in enhancement of detection precision that the power of the detection signal is kept constant (fixed) on the time axis from the arrival of a detection signal from the transmitter connected to one end of the first leakage coaxial cable to generate a pulse signal at the receiver of the second leakage coaxial cable till the arrival of the detection signal at the computing unit.

Furthermore, when the first leakage coaxial cable laid on around the monitoring district and connected to the transmitter at one end thereof or the second leakage coaxial cable connected to the receiver at one end thereof falls into a characteristic state different from the normal characteristic state thereof due to some cause (for example, in the case of disconnection of the leakage coaxial cable or similar cases), the differential waveform between the envelope curve of the signal waveform picked up from the filter (hereinafter referred to as "detected envelope curve") and the envelope curve of the signal waveform under the state that no obstacle exists (hereinafter referred to as "reference envelope curve") becomes large, so that the present state is regarded as being identical to the state where an obstacle is detected (i.e., error detection).

Still furthermore, when the power of the detection signal received by the second leakage coaxial cable passes from the receiver to the computing unit is small, the differential waveform between the detected envelope curve and the reference envelope curve is small, so that the present state falls into an obstacle undetectable state (non-detection).

Prior Art Patent Document 1: JP-A-10-95338 (FIG. 1 and description thereof)

As described above, in order to enhance the detection precision in the conventional obstacle detecting device, it is required that the power of the detection signal from the time when it reaches the receiver from the transmitter for generating the pulse signal till the time when the detection signal reaches the computing unit from the receiver is made constant on the time axis. However, the constituent elements constituting the transmitter and the receiver have temperature-dependent characteristics and aged characteristics caused by continuous operation, and thus the conventional obstacle detecting device has a problem that the power is not constant, but varies on the time axis until it reaches the computing unit.

If the problem as described above exists, when the leakage coaxial cable has a characteristic different from the normal characteristic (stationary state) due to some cause, it cannot be identified which one of intrusion of an obstacle and characteristic variation of the leakage coaxial cable occurs. Accordingly, the obstacle detecting device is set to the same state as the state where an obstacle is detected, and thus error detection occurs.

Likewise, if the problem as described above exists, the differential waveforms when an obstacle exists and when no obstacle exists are not fixed. Accordingly, it is impossible to settle a threshold value for the differential waveform to determine detection of an obstacle, and thus there occurs a state that the differential waveform does not exceed the threshold value even when an obstacle actually intrudes (non-detection) or a state that the differential waveform exceeds the threshold value because an object moves at the outside of the obstacle monitoring district (this case is also referred to as "error detection").

Likewise, if the problem as described above exists, when the output power of the transmitter (the power of the pulse signal) exceeds the permissible transmission power of the transmitter and when the reception power of the receiver (the power of the detected pulse signal) exceeds the permissible reception power of the receiver, the pulse signal (detection signal) transmitted from the transmitter and the detection signal which is received by the receiver and then reaches the computing unit become distorted signals. Therefore, when the detection signal reaches the computing unit, the computing unit cannot recognize it as the detection signal output from itself. Accordingly, it is impossible to form the envelope curve, and the present state falls into the state that the differential waveform does not exceed the threshold value (non-detection) even when an obstacle intrudes.

That is, the conventional device is required to be placed under such an environment that the temperature is stable at all time, and when it is used in the open air under which the temperature rapidly varies, error detection or non-detection may occur. Furthermore, error detection or non-detection may also occur due to aged deterioration, and thus it is required to perform maintenance at a short period, that is, correct the threshold value or the like. Furthermore, the velocity of the detection signal in the leakage coaxial cable is dependent on the specific dielectric constant in the leakage coaxial cable. Therefore, when the specific dielectric constant varies due to aged deterioration or the like, the velocity of the detection signal, varies. In connection with this variation, an aberration occurs in the conversion of the detection signal to the detection position, and thus there is a problem that the intrusion position cannot be accurately measured.

SUMMARY OF THE INVENTION

The present invention has been implemented to solve the above problem, and has an object to enhance the detection precision of the obstacle (intruder) detecting device.

In order to attain the above object, according to the present invention, an obstacle (or intruder) detecting system having leakage coaxial cables laid on at both the sides of an obstacle monitoring district and an obstacle detecting device for emitting electrical waves from one of the leakage coaxial cables laid on at both the sides to the other leakage coaxial cable and detecting an obstacle in the obstacle monitoring district on the basis of the electrical waves incident to the other leakage coaxial cable is further equipped with an electrical wave transmitting unit for transmitting the electrical waves to the one leakage coaxial cable in the obstacle detecting device, an electrical wave receiving unit for receiving the electrical waves incident to the other leakage coaxial cable, and a connecting unit for connecting the electrical wave transmitting unit and the electrical wave receiving unit. Therefore, the present invention has an effect of enhancing the detection precision of the obstacle detecting device.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments according to the present invention will be described hereunder with reference to the accompanying drawings.

First Embodiment

A first embodiment according to the present invention will be described in detail with reference to the drawings.

Figure 1:
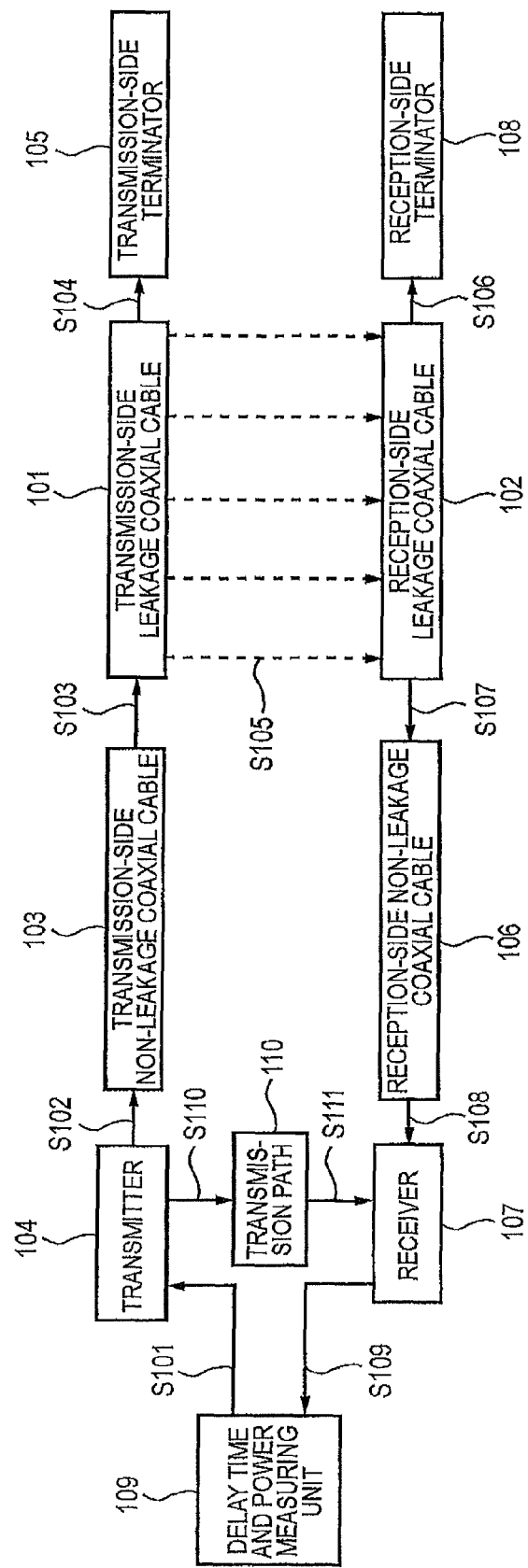
FIG. 1 is a diagram showing the system construction of an obstacle detecting system according to a first embodiment of the present invention.

FIG. 1 is a block diagram showing an obstacle detecting device having a function showing a first embodiment of the present invention.

In FIG. 1, two leakage coaxial cables 101 and 102 are laid on in parallel around a monitoring district. A transmitter 104 is connected to one end of the transmission-side leakage coaxial cable 101 through a transmission-side non-leakage coaxial cable 103 and a transmission-side terminator 105 is connected to the other end (the opposite side) of the transmission-side leakage coaxial able 101. Furthermore, a receiver 107 is connected to one end of the reception-side leakage coaxial cable 102 through a reception-side non-leakage coaxial cable 106, and a reception-side terminator 108 is connected to the other end (the opposite side) of the reception-side leakage coaxial cable 102. The transmitter 104 and the receiver 107 are connected to a delay time and power measuring unit 109. A transmission path 110 is further provided between the transmitter 104 and the receiver 107.

A transmission signal 5101 generated in the delay time and power measuring unit 109 is transmitted through the transmission-side non-leakage coaxial cable 103 to the transmission-side leakage coaxial cable 101 as a transmission signal 5103 by the transmitter (electrical wave transmitting unit) 104.

The transmission signal 5103 is successively emitted from respective slots (electrical wave emission holes) arranged in the longitudinal direction of the transmission-side leakage coaxial cable 101 as electrical waves to the reception-side leakage coaxial cable 102 which is laid on at the opposite side to the transmission-side leakage coaxial cable 101 (S105). The emitted transmission signal S105 is emitted while delayed in accordance with the slot position, and successively incident to each slot (electrical wave reception hole) of the reception-side leakage coaxial cable 102 in conformity with the delay time of the emitted electrical wave.

The signal incident to the reception-side leakage coaxial cable 102 is received by the receiver (electrical wave receiving unit) 107 through the reception-side non-leakage coaxial cable 106, and input to the delay time and power measuring unit (electrical wave transmitting unit, detecting unit) 109. When an obstacle exists in the range (the monitoring district) surrounded by the leakage coaxial cables 101 and 102, the electrical waves are intercepted by the obstacle, and thus the power level of the reception signal varies at the position where the obstacle exists. Accordingly, with respect to the waveform of the reception signal, a power-level variation appears at the time corresponding to the locating position of the obstacle. On the basis of this power-level variation, the delay time and power measuring unit 109 can detect the presence or absence of an obstacle, and also detect the position of the obstacle which corresponds to the vicinity of the slot position.

Figure 2:
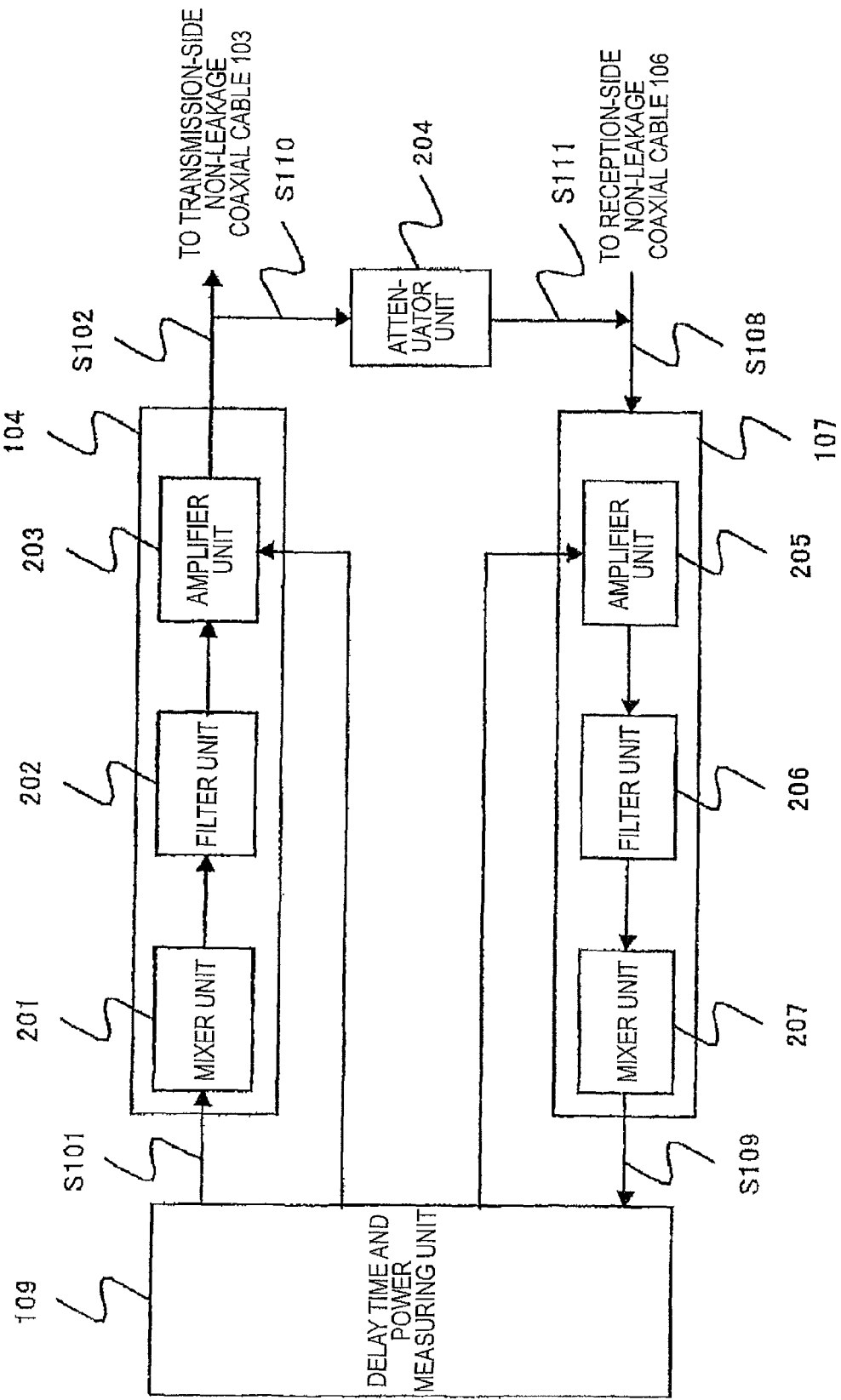
FIG. 2 is a diagram showing the schematic construction of the obstacle detecting device shown in FIG. 1 according to the first embodiment of the present invention.

FIG. 2 is a block diagram showing the details of the transmitter 104, the receiver 107 and the transmission path 110 of the obstacle detecting device according to the first embodiment of the present invention.

In FIG. 2, the delay time and power measuring unit 109 first generates the detection signal S101. The generated signal 5101 passes through a mixer unit 201, a filter unit 202 and an amplifier unit 203 of the transmitter 104, and reaches the transmission-side non-leakage coaxial cable 103. A part of the detection signal reaches an attenuator unit 204 of the transmission path 110.

Furthermore, the detection signal coming from the reception-side non-leakage coaxial cable 106 and the detection signal 5108 passing through the attenuator unit 204 pass through an amplifier unit 205, a filter unit 206 and a mixer unit 207 of the receiver 107 and reaches the delay time and power measuring unit 109 to detect the presence or absence of an obstacle and the position of the obstacle.

As described above, the detection signal passes through the two paths and reaches the delay time and power measuring unit 109. With respect to the detection signal concerned, the detection signal (S110, 5111) which passes through the attenuator unit 204 and reaches the delay time and power measuring unit 109 follows a path which passes through only the constituent elements of the transmitter 104 and the receiver 107 and the attenuator unit 204 and reaches the delay time and power measuring unit 109 again.

Accordingly, by detecting the detection signal (S110, 5111) passing through the attenuator unit 204, the temperature characteristic variation, the aged characteristic variation, etc. based on the constituent elements of the transmitter 104 and the receiver 107 are monitored and corrected, whereby the power from the arrival of the signal at the transmitter 104 and the receiver 107 till the arrival of the signal at the delay time and power measuring unit 109 can be kept fixed on the time axis.

Figure 3:
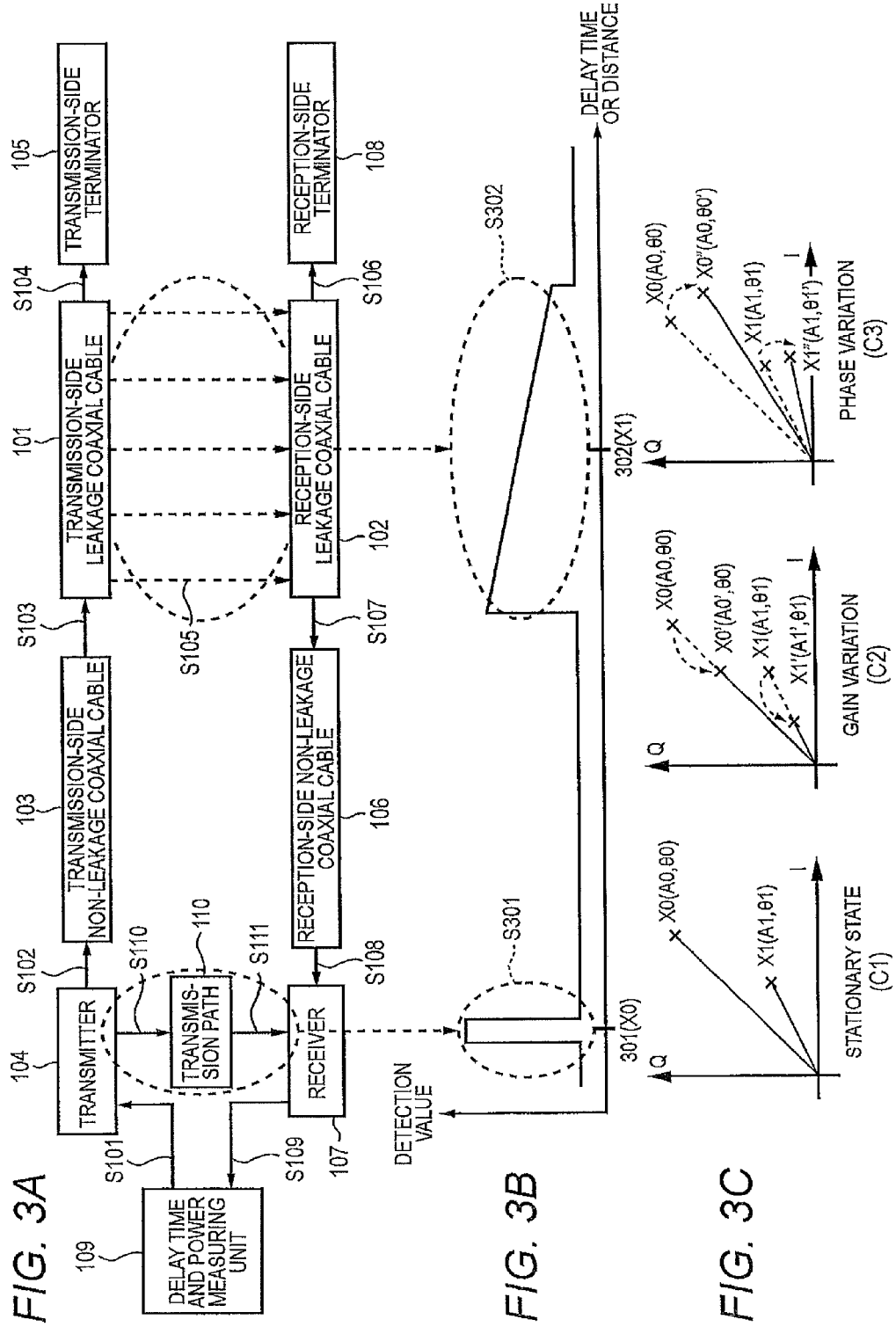
FIG. 3 is a diagram showing the function of the system shown in FIG. 1 in the first embodiment of the present invention.

FIG. 3 is a diagram showing the detection manner described above.

In FIG. 3, when detected in the delay time and power measuring unit 109, the detection signal 5110 passing from the delay time and power measuring unit 109 through the transmitter 104 to the transmission path 110 is shorter in delay time than the detection signal S105 passing from the transmission-side leakage coaxial cable 101 through the reception leakage coaxial cable 102 to the delay time and power measuring unit 109. When the delay time is measured in the delay time and power measuring unit 109 is measured, the detection signal 5110 is output as an earliest detection value 5301.

Accordingly, by monitoring the detection value 5301 and performing correction on the basis of the detection value S301, the power from the arrival of the detection signal at the transmitter 104 and the receiver 107 till the arrival of the detection signal at the delay time and power measuring unit 109 can be kept fixed on the time axis.

Next, the correction from the stationary state will be described by using graphs and mathematical formulas.

In FIG. 3, the amplitude and phase of 312(X0) of the stationary state ((C1) of FIG. 3) are represented by $A0$ and $\theta0$ and the amplitude and phase of 313(X1) of the stationary state ((C1) of FIG. 3) are represented by $A1$ and $\theta1$.

Here, it is assumed that the gain of the transmitter 104 or the receiver 107 varies ((C2) of FIG. 3). In this case, X0 moves to X0', and the amplitude is set to A0' (the phase does not vary). The variation $\alpha0$ is represented by $\alpha0=(A0'/A0)$. Likewise, X1 also moves to X1', and the variation $\alpha1$ is represented by $\alpha1=(A1'/A1)$. Here, $\alpha1$ and thus the following formula is satisfied.

$$A1'/\alpha1 = A1'/(A0'/A0) = A1$$

Accordingly, even when A1 varies to A1', A1' can be corrected to A1 by monitoring A0 and A0'.

Next, it is assumed that the phase of the transmitter 104 or the receiver 107 varies ((C3) of FIG. 3).

In this case, X0 moves to X0", and the phase is set to $\theta0'$ (the gain does not vary).

The variation $\Delta\theta0$ is represented by $\Delta\theta0 = \tan^{-1}X0' - \tan^{-1}X0$. Likewise, X1 also moves to X1", and the variation $\Delta\theta1$ is represented by $\Delta\theta1 = \tan^{-1}X1' - \tan^{-1}X1$. Here, $\Delta\theta0 = \Delta\theta1$, and thus the formula the formula 1 can be represented as follows by using determinant of matrix;

$$\begin{pmatrix} \cos\Delta\theta1 & \sin\Delta\theta1 \\ -\sin\Delta\theta1 & \cos\Delta\theta1 \end{pmatrix} \begin{pmatrix} A1\cos\theta1' \\ A1\sin\theta1' \end{pmatrix} =$$

$$\begin{pmatrix} \cos\Delta\theta0 & \sin\Delta\theta0 \\ -\sin\Delta\theta0 & \cos\Delta\theta0 \end{pmatrix} \begin{pmatrix} A1\cos\theta1' \\ A1\sin\theta1' \end{pmatrix} = \begin{pmatrix} A1\cos\theta1 \\ A1\sin\theta1 \end{pmatrix}$$

Accordingly, even when $\theta1$ varies to $\theta1'$ due to the phase variation, $\theta1'$ can be corrected to $\theta1$ by monitoring $\theta0$ and $\theta0'$.

As described above, the correction from the stationary state is described while separating the situation into the gain case and the phase case. However, the corrections for the gain and the phase can be collectively performed. In this case, the complex number operation is used.

In FIG. 3, when the complex notation of the stationary state of 301 (X0) is represented by $X0=|A0|e^{j\theta0}$, and the complex notation when the gain and the phase vary are represented by $X0'''=|A0'|e^{j\theta0'}$, the variation $\Delta X0'$ is represented as follows:

$$\Delta X0''' = \frac{X0'}{X0} = \frac{|A0'|}{|A0|}e^{j(\theta0'-\theta0)}$$

Next, it is assumed that the gain and the phase of 302 (X1) (complex notation: $X1=|A1|e^{j\theta1}$) vary, and the complex notation varies to $X1'''=|A1'|e^{j\theta1'}$. In order to return X1''' to X1, X1''' is divided X1''' by known $\Delta X0'''$.

$$\frac{X1'''}{\Delta X0'''} = \frac{|A1'|e^{j\theta1'}}{\frac{|A0'|}{|A0|}e^{j(\theta0'-\theta0)}} = |A1'| \cdot \frac{|A0|}{|A0'|}e^{j(\theta1'-\theta0'+\theta0)}$$

In the above formula, the following relational expressions are satisfied:

$$|A1'| \cdot \frac{|A0|}{|A0'|} = |A1'| \cdot \frac{1}{\alpha} = |A1|,$$

$$\theta1' - \theta0' + \theta0 = \theta1' + \Delta\theta = \theta1$$

Therefore, $$\frac{X1'''}{\Delta X0'''} = |A1'| \cdot \frac{|A0|}{|A0'|}e^{j(\theta1'-\theta0'+\theta0)} = |A1'|e^{j\theta1} = X1$$

Accordingly, when the detection signal (stationary state: X1) at any point (313) of the leakage coaxial cable in FIG. 3 varies in gain and phase (X1→X'''), it can be returned to the detection signal (X1) of the stationary state by using the detection signal variation ΔX0''' (known) in the transmission path.

Figure 4:
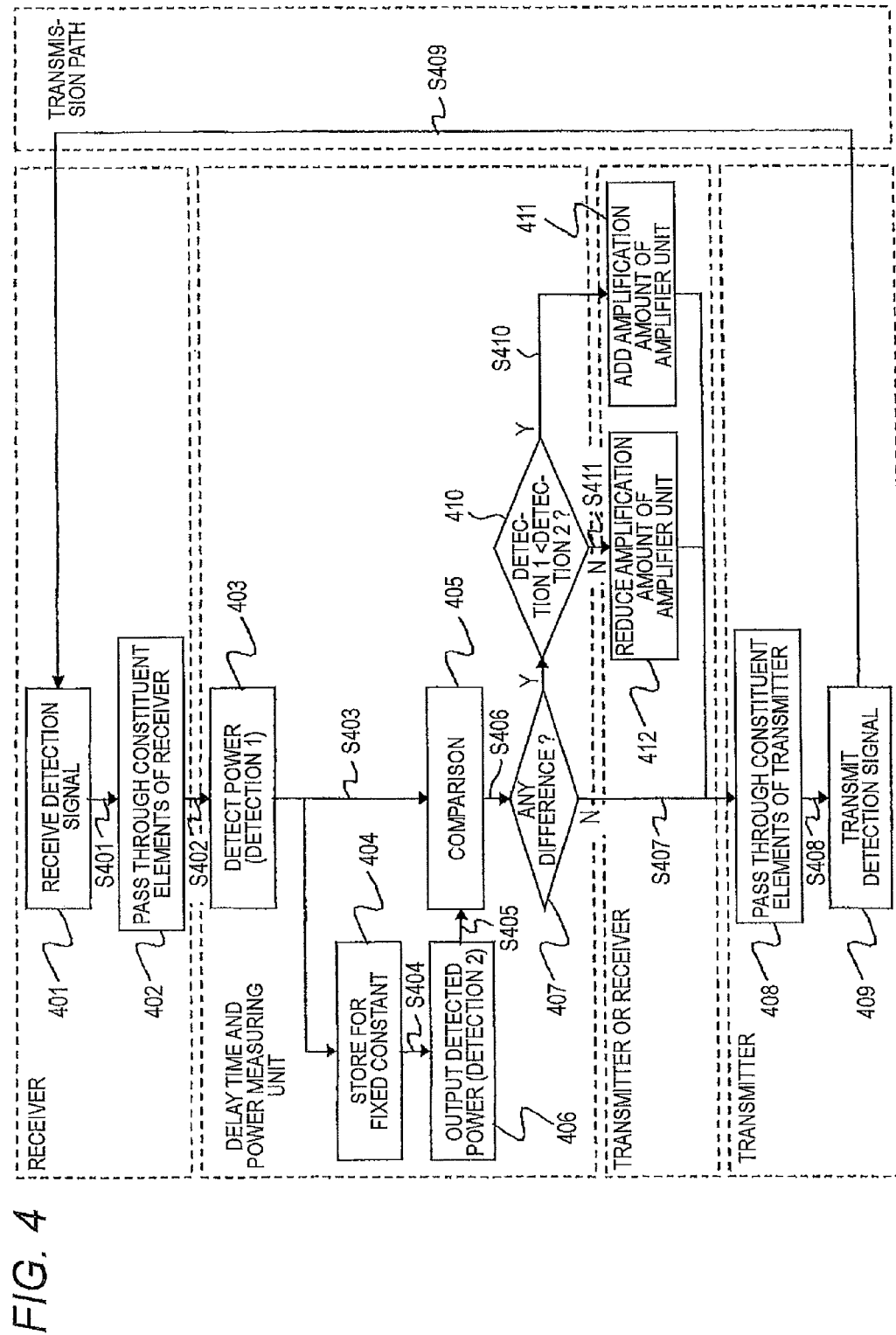
FIG. 4 is a flowchart exemplifying the operation flow of the first embodiment of the present invention.

FIG. 4 is a flowchart for monitoring and correction based on detection of the detection signal.

In FIG. 4, after a detection signal is first received (401), the detection signal concerned is passed through the constituent elements of the receiver (402). Subsequently, power detection is executed on the detection signal S402 passing through the constituent elements of the receiver. After the power detection is executed (403), the detection signal S402 is split to a detection signal to be stored for a fixed time (404) and a detection signal to be compared as a compared value (405). In the comparison (405), the detection value (403) of the sequentially received detection signal is compared with the output value (406) of the detected power stored for a fixed time (404). When there is no difference in the comparison (405), the detection signal passes through the constituent elements of the transmitter (408) as usual, and the detection signal is transmitted (409).

Subsequently, when it is determined in the comparison (405) that there is some difference, it is determined whether the value of detection 1 (403 in FIG. 4) is smaller than the value of detection 2 (406 in FIG. 4) (410). When it is determined that the value of the detection 1 is smaller than the value of the detection 2, the amplification amount of the detection signal is added at the amplifier unit 203 of the transmitter 104 or the amplifier unit 205 of the receiver 107. When it is not determined that the value of the detection 1 is smaller than the value of the detection 2, the amplification amount of the detection signal is reduced at the amplifier unit 203 of the transmitter 104 or the amplifier 205 of the receiver 107.

As described above, according to the construction as shown in FIG. 1, the power of the detection signal from the arrival of the detection signal at the transmitter 104 and the receiver 107 till the arrival of the detection signal at the delay time and power measuring unit 109 can be kept fixed on the time axis while the temperature characteristic variation and the aged characteristic variation are also taken into consideration. Accordingly, the risk that the error detection or the non-detection occurs can be avoided, and it is unnecessary to perform maintenance at a short period.

Likewise, according to the construction as shown in FIG. 1, rapid power variation is monitored and the soundness of the transmitter 104 and the receiver 107 can be estimated.

The transmission path for directly passing a signal from the transmitter to the receiver is provided, and a part of the power of the signal transmitted from the transmitter can be transmitted from the receiver to the computing unit without passing through the leakage coaxial cable. Accordingly, the power transmitted from the transmitter to the receiver can be monitored, and thus the power transmitted to the one leakage coaxial cable and the power of the signal received by the other leakage coaxial cable can be kept constant until the power is transmitted from the receiver to the computing unit. Therefore, an obstacle detecting device having high detection precision can be obtained.

Furthermore, there is no risk that error detection or non-detection occurs even when the device is used in the open air in which the temperature rapidly varies.

Still furthermore, even when the level variation caused by aged deterioration occurs, it can be corrected and thus there is no risk that error detection or non-detection occurs.

Still furthermore, the transmission signal is bypassed to the reception side at the start point and the terminal of the leakage coaxial cable. Therefore, even when the specific dielectric constant varies due to aged deterioration or the like, so that the velocity of the signal varies, the positions of the start point and the end point can be known and thus the intrusion position of an obstacle can be accurately measured at all times.

Second Embodiment

In the first embodiment, the transmission path 110 is disposed between the transmitter 104 and the receiver 107, however, the transmission path may be disposed between the transmission-side non-leakage coaxial cable 103 and the reception-side non-leakage coaxial cable 106.

Figure 5:
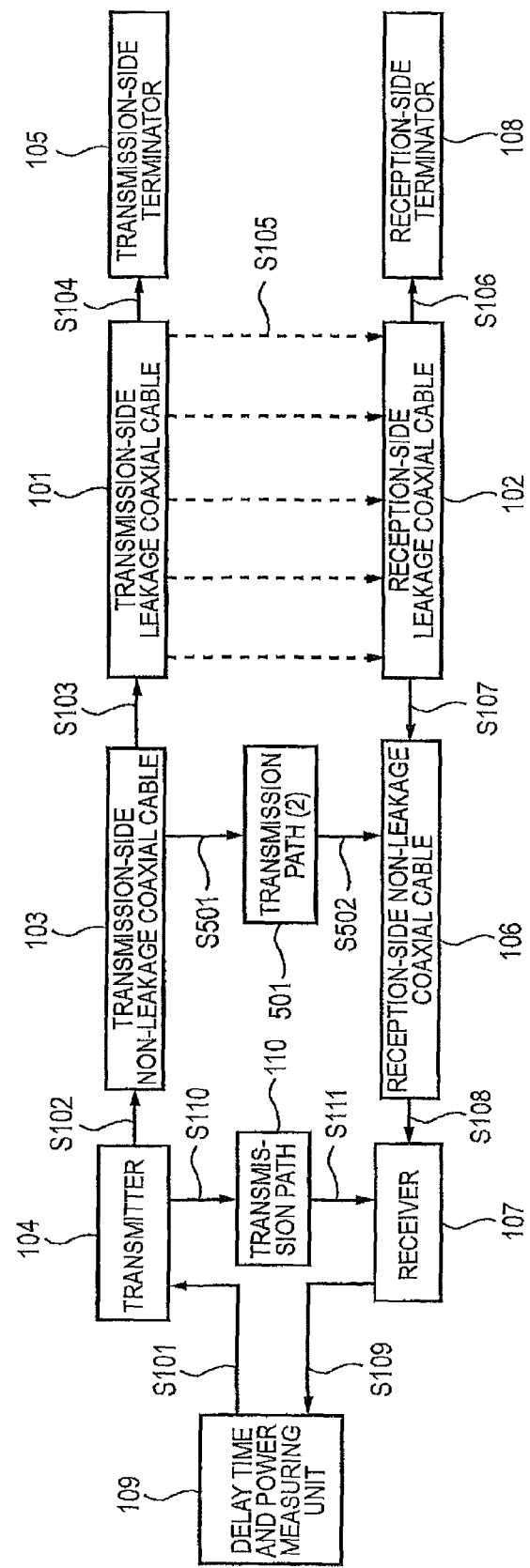
FIG. 5 is a diagram exemplifying another system construction of an obstacle detecting system according to a second embodiment of the present invention.

FIG. 5 is a block diagram showing the obstacle detecting device having the function according to a second embodiment of the present invention.

In FIG. 5, a transmission path (1) 110 has the same function as the transmission path 110 shown in FIG. 1. A transmission path (2) 501 is a transmission path which is disposed at the leakage-coaxial cable side and connects the transmission-side non-leakage coaxial cable 103 and the reception-side non-leakage coaxial cable 106. The other constituent elements are the same as the construction shown in FIG. 1 and thus the description thereof is omitted.

In FIG. 5, the detection signal S102 transmitted from the transmitter 104 passes through the transmission-side non-leakage coaxial cable 103 and reaches the transmission-side leakage coaxial cable 101 and the transmission path (2) 501. The detection signal S103 reaching the transmission-side leakage coaxial cable 101 is emitted as electrical waves from the transmission-side leakage coaxial cable 101, and reaches the reception-side leakage coaxial cable 102, thereby plating the role of detecting intrusion of an obstacle.

Next, the detection signal S501 reaching the transmission path (2) 501 will be described.

After reaching the transmission path (2) 501, this signal passes from the reception-side non-leakage coaxial cable 106 to the receiver 107. The signal reaching the receiver 107 passes through the constituent elements of the receiver and then reaches the delay time and power measuring unit 109. Accordingly, the temperature characteristic variation and the aged characteristic variation containing those of the path extending from the transmission-side non-leakage coaxial cable 103 to the reception-side non-leakage coaxial cable 106 can be monitored and corrected. Furthermore, the monitoring operation of the transmission path (2) 501 is executed in combination with the monitoring operation of the transmission path (1) 110, whereby the soundness of the transmitter 104, the receiver 107, the transmission-side non-leakage coaxial cable 103 and the reception-side non-leakage coaxial cable 106 can be monitored.

Figure 6:
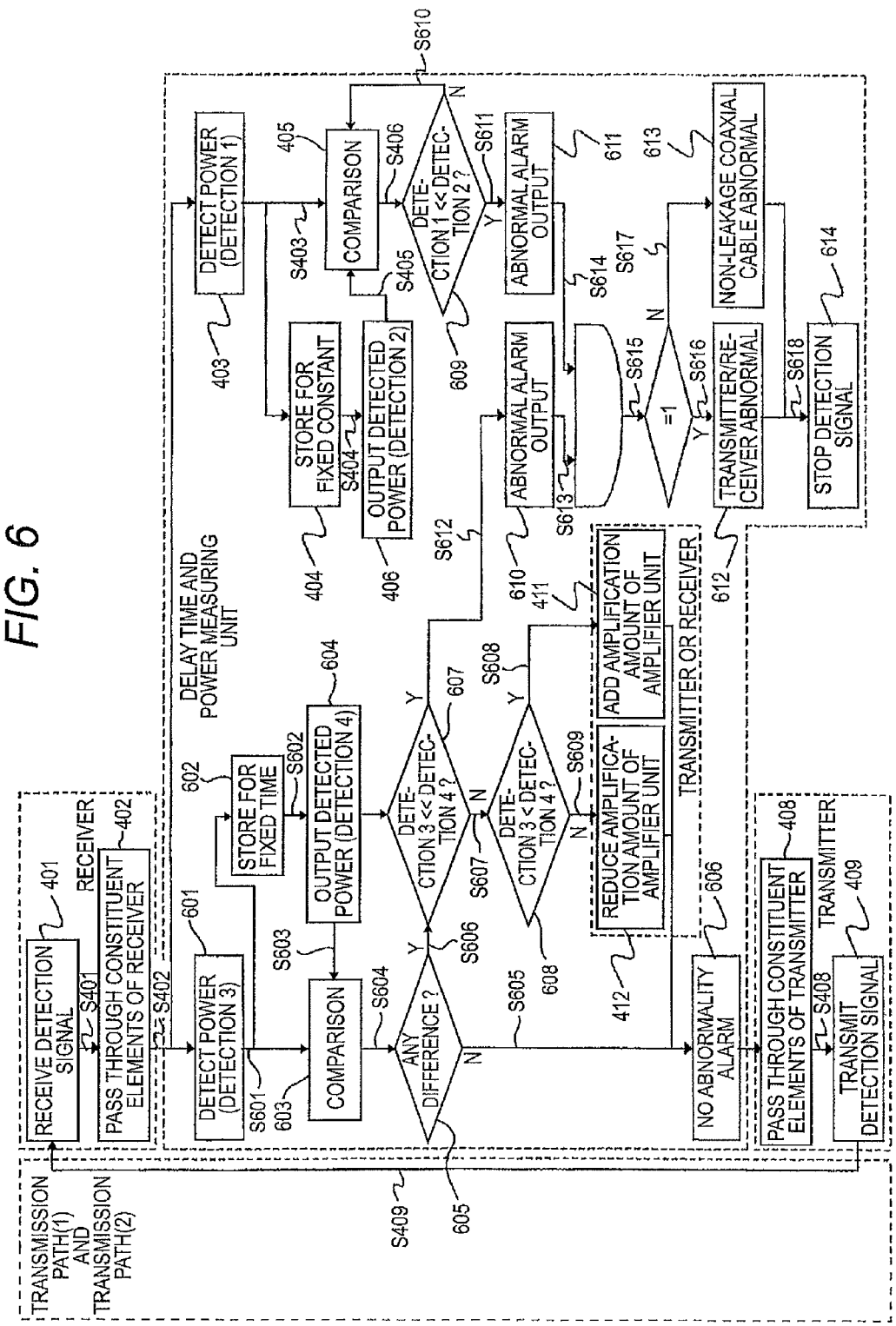
FIG. 6 is a flowchart exemplifying the operation flow in the second embodiment according to the present invention.

FIG. 6 is a monitoring and correcting flowchart based on wave detection monitoring of the second embodiment.

In FIG. 6, the description of the detection and monitoring block shown in FIG. 4 is omitted.

Power detection (601) of a signal passing through the route of the transmission path (2) is executed, and then the signal concerned is divided into a signal whose value is stored for a fixed time (602) and a signal whose value is to be compared (603) as a compared value. In the comparison (603), the detection value 601 of the sequentially-received signal passing through the route of the transmission path (2) is compared with the output value (60.4) of the detected power stored for a fixed time (602). As a result of the comparison (603), when it is not determined that there is any difference (605), no abnormality alarm is output (606), and the detection signal is passed through the constituent elements of the transmitter (408) as usual and transmitted (409).

Next, as a result of the comparison (603), when it is judged that there is some difference (605), the difference between a detection 3 (601 in FIG. 6) and a detection 4 (604 in FIG. 6) is determined (607). Any threshold value is set in the determination step (607), and it is determined whether the difference between the detection 3 and the detection 4 is larger than the threshold value or not.

When it is not determined that the difference between the detection 3 and the detection 4 is larger than any threshold value, it is determined whether the value of the detection 3 is smaller than the value of the detection 4 (608). When it is determined that the value of the detection 3 is smaller than the value of the detection 2 (YES; 608), the amplification amount of the detection signal is added at the amplifier unit 203 of the transmitter 104 or the amplifier unit 205 of the receiver 107. When it is not determined that the value of the detection 3 is smaller than the value of the detection 4, the amplification amount of the detection signal is reduced at the amplifier unit 203 of the transmitter 104 or the amplifier unit 205 of the receiver 107.

Next, an operation when it is determined that the difference between the detection 3 and the detection 4 is larger than any threshold value, and an operation when it is determined on the basis of the comparison (405) between signals passing through the route of the transmission path (1) that the difference between the detection 1 and the detection 2 is larger than any threshold value (609) will be described. In these cases, abnormality alarms 610 and 611 are output respectively. Accordingly, the user side can recognize that some abnormality occurs in the detecting device. When any one of the abnormality alarms is output, the product of both the abnormality alarms 610 and 611 is obtained. When the product of the abnormality alarms is equal to 1, an alarm 612 indicating that the transmitter 104 or the receiver 107 is abnormal is output, and the detection signal (detecting operation) is stopped. Subsequently, when the product of the abnormality alarms is equal to zero, an alarm 613 indicating that the transmission-side non-leakage coaxial cable 103 or the reception-side non-leakage coaxial cable 106 is abnormal is output, and the detection signal (detecting operation) is stopped.

As described above, according to the construction as shown in FIG. 5, the temperature characteristic variation and the aged characteristic variation of the constituent elements from the transmission-side non-leakage coaxial cable 103 to the reception-side non-leakage coaxial cable 106 can be monitored and corrected, and the soundness of the transmitter 104, the receiver 107, the transmission-side non-leakage coaxial cable 103 and the reception-side non-leakage coaxial cable 106 can be monitored. Accordingly, the risk that error detection or non-detection occurs can be eliminated, the maintenance at a short period is unnecessary and also the soundness of the obstacle detecting device can be monitored.

Third Embodiment

In the second embodiment, the transmission paths are disposed between the transmitter 104 and the receiver 107 (the transmission path 11) and between the transmission-side non-leakage coaxial cable 103 and the reception-side non-leakage coaxial cable 106 (transmission path 501). However, in this embodiment, the transmission path may be disposed between the transmission-side leakage coaxial cable 101 and the reception-side leakage coaxial cable 102.

Figure 7:
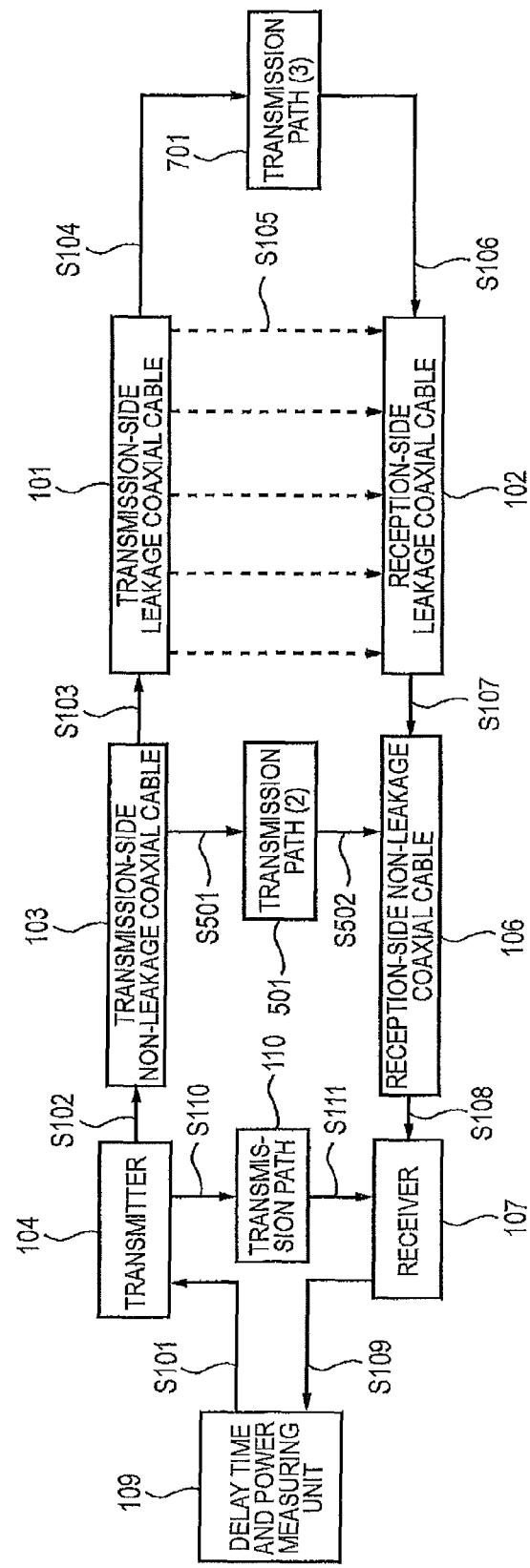
FIG. 7 is a diagram exemplifying another system construction of the obstacle detecting system according to a third embodiment of the present invention.

FIG. 7 is a block diagram showing the obstacle detecting device according to a third embodiment of the present invention.

In FIG. 7, a transmission path (3) 701 is a transmission path for connecting the transmission-side leakage coaxial cable 101 and the reception-side leakage coaxial cable 102, and the transmission path (3) 701 is disposed at the place from which the transmission-side terminator 105 and the reception-side terminator 108 shown in FIGS. 1 and 5 are detached. The other constituent elements are the same as the construction shown in FIG. 5, and thus the description thereof is omitted.

In FIG. 7, the detection signal 5103 transmitted from the transmission-side non-leakage coaxial cable 103 reaches the transmission-side leakage coaxial cable 101. The detection signal reaching the transmission-side leakage coaxial cable 101 is split into a signal emitted as electrical waves from the transmission-side leakage coaxial cable 101 to detect an obstacle and passing to the reception-side leakage coaxial cable 102 (S105), and a signal passing to the transmission path (3) 701. The detection signal (S104, 5106) reaching the transmission path (3) 701 passes from the reception-side leakage coaxial cable 102 through the reception-side non-leakage coaxial cable 106 to the receiver 107. The signal 5108 which reaches the receiver 107 passes through the constituent elements of the receiver and reaches the delay time and power measuring unit 109. Accordingly, the soundness of the route from the transmission-side leakage coaxial cable 101 to the reception-side leakage coaxial cable 102 can be monitored. Furthermore, the precision of the obstacle intrusion position can be corrected.

Figure 8:
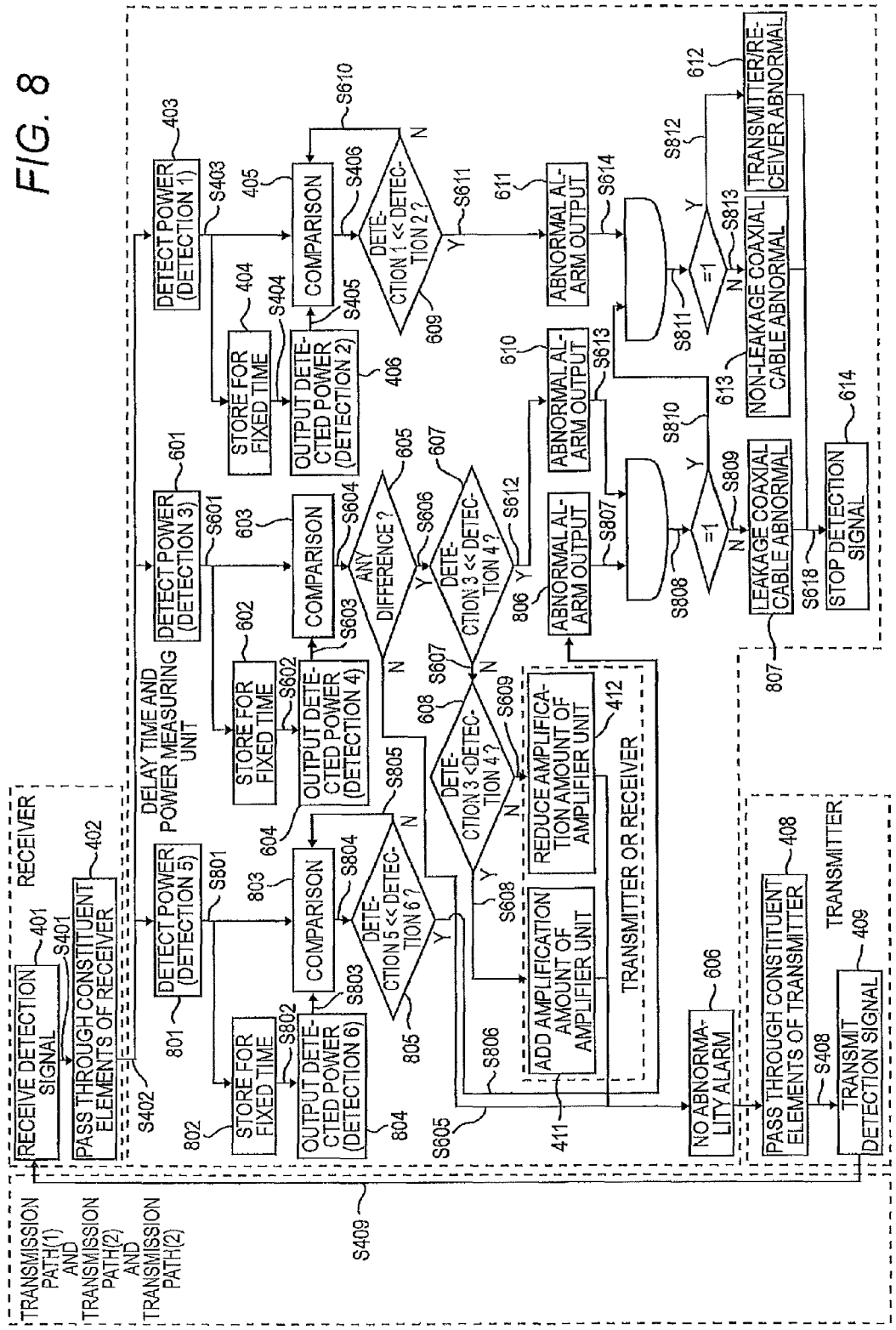
FIG. 8 is a flowchart exemplifying the operation flow of the third embodiment of the present invention.

FIG. 8 is a monitoring flowchart based on the wave detection of the third embodiment.

In FIG. 8, the description on the wave detecting and monitoring blocks shown in FIG. 6 is omitted.

After power detection (801) is executed on the signal passing through the route of the transmission path (3), the signal is split to a signal whose value is held for a fixed time (802) and a signal to be compared as a measured value (803). In the comparison (803), the detection value 801 of the sequentially-received signal passing through the route of the transmission path (3) is compared with the output value 804 of the detected power stored for a fixed time (802). As a result of the comparison (803), when it is not determined that the difference between the detection 5 (801) and the detection 6 (804) is larger than any threshold value, no action is taken.

Next, an operation when it is determined as a result of the comparison (803) that the difference between the detection 5 and the detection 6 is larger than any threshold value will be described. In this case, an abnormality alarm 806 is output. Accordingly, the user can recognize that some abnormality occurs in the detection device.

Thereafter, an abnormality-occurring place is specified by the abnormality alarms 806, 610 and 611. First, the product of the abnormality alarms 806 and 610 is obtained. When the product of the abnormality alarms is equal to zero, an alarm indicating that the transmission-side leakage coaxial cable 101 or the reception-side leakage coaxial cable 102 is abnormal is output (807), and the detection signal (the detecting operation) is stopped. Subsequently, when the product of the abnormality alarms 806 and 610 is equal to 1, the product of the above product result "1" and the abnormality alarm 611 is obtained. When the product is equal to 0, an alarm 613 indicating that the transmission-side non-leakage coaxial cable 103 or the reception-side non-leakage coaxial cable 106 is abnormal is output, and the detection signal (detecting operation) is stopped. Finally, when the product of the abnormality alarms 806, 610 and 611 is equal to 1, an alarm indicating that the transmitter 104 or the receiver 107 is abnormal is output, and the detection signal (detecting operation) is stopped.

Figure 9:
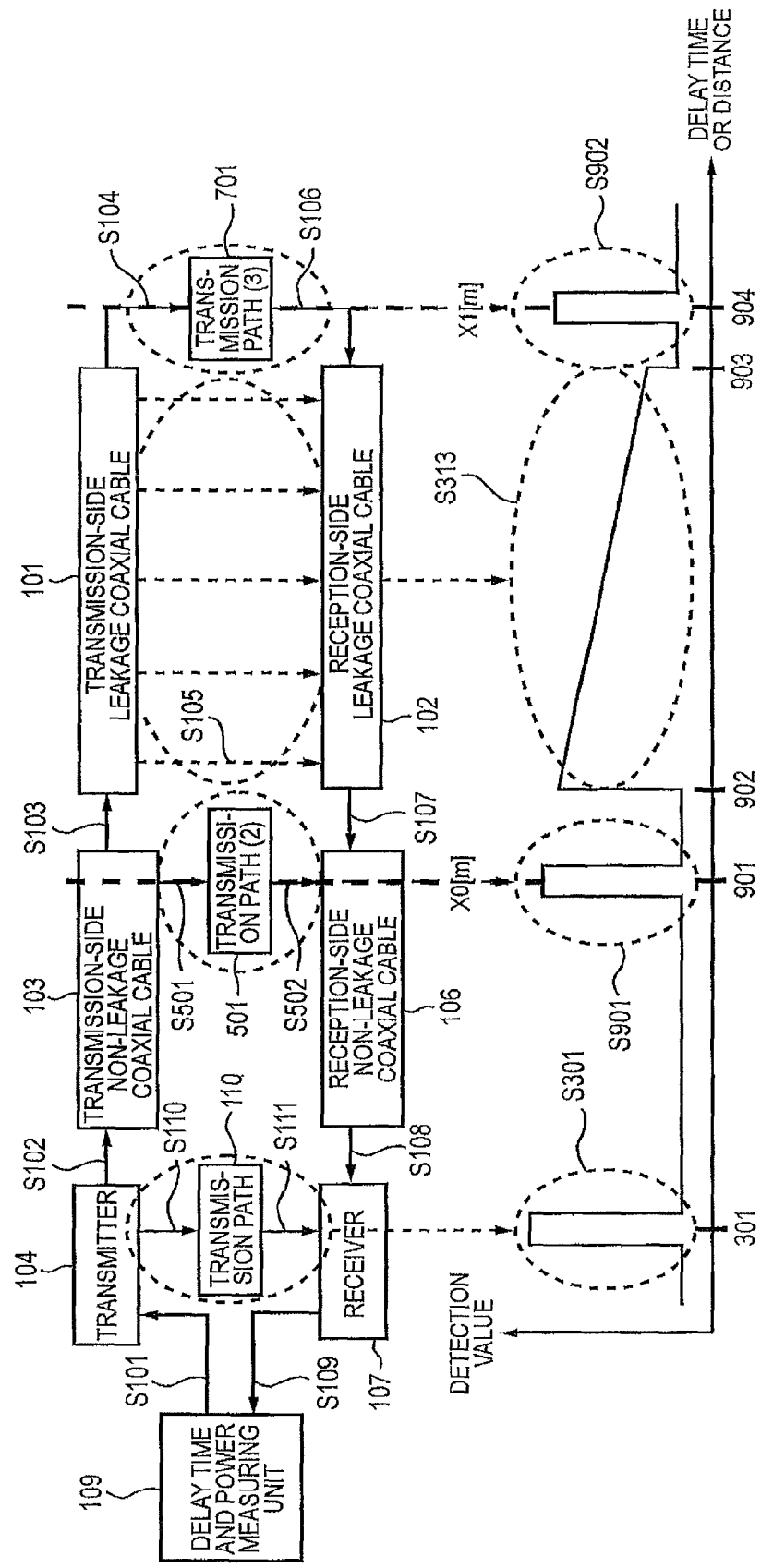
FIG. 9 is a diagram exemplifying the function of the system shown in FIG. 7 in the third embodiment of the present invention.

FIG. 9 is a diagram showing the correction of the precision of the obstacle intrusion position based on the wave detection in the third embodiment.

In FIG. 9, the relationship between the detection value and each delay time (or distance) is illustrated in the block diagram of the third embodiment.

With respect to the distance 301 corresponding to the detection value S301 of the transmission path 110, the distance 901 corresponding to the detection value 5901 of the transmission path (2) 501, the distances 902 to 903 corresponding to the detection value 5313 passing through the route from the reception-side leakage coaxial cable 101 to the reception-side leakage coaxial cable 102 and the distance 904 corresponding to the detection value 5902 of the transmission path (3) 701, 902 to 903 represent an obstacle detection range.

Therefore, the precision of the detection position of the obstacle detecting device is corrected by using 5901 and S902 (901, 904).

First, the length of the transmission-side leakage coaxial cable 101 and the length of the reception-side leakage coaxial cable 102 between the transmission path (2) 501 and the transmission path (3) 701 are known. Subsequently, when the distance 901 from the delay time and power measuring unit 109 to the transmission path (2) is represented by X0 [m] and the distance 904 from the delay time and power measuring unit 109 to the transmission path (3) is represented by X1 [m], the distance from X0 [m] to X1 [m] is the same as the length of each of the leakage coaxial cables 101 and 102. Therefore, the distance 901, 904 obtained on the basis of the detection values is corrected by the length of, the leakage coaxial cable (X0-X1) [m], whereby the total length of the obstacle detection range can be settled, and the precision of the detection position when an obstacle intrudes can be corrected by equally dividing the interval between 901 and 904.

As described above, according to the construction shown in FIG. 7, the temperature characteristic variation and the aged characteristic variation of the route from the transmission-side non-leakage coaxial cable 103 to the reception-side non-leakage coaxial cable 106 can be monitored and corrected, and also the soundness of the transmitter 104, the receiver 107, the transmission-side non-leakage coaxial cable 103, the reception-side non-leakage coaxial cable 106, the transmission-side leakage coaxial cable 101 and the reception-side leakage coaxial cable 102 can be monitored. Accordingly, the risk that error detection or non-detection occurs can be eliminated, the maintenance at a short period is unnecessary and the soundness of the obstacle detecting device can be monitored.

Likewise, according to the construction shown in FIG. 7, the precision of the obstacle intrusion detecting position can be corrected.

Fourth Embodiment

In the third embodiment, the transmission paths are disposed between the transmitter 104 and the receiver 107 (the transmission path 110), between the transmission-side non-leakage coaxial cable 103 and the reception-side non-leakage coaxial cable 106 (the transmission path 501) and between the terminating portion of the transmission-side leakage coaxial cable 101 and the terminating portion of the reception-side leakage coaxial cable 102 (the transmission path 701). However, the transmission path may be disposed at a grading place of the transmission-side leakage coaxial cable and the reception-side leakage coaxial cable.

In this case, "grading" is a method with which the electrical field intensity of a detection signal emitted by using cables having different characteristics or the electrical field intensity of a received detection different signal is kept to, some value or more, and the details thereof will be described later.

Figure 10:
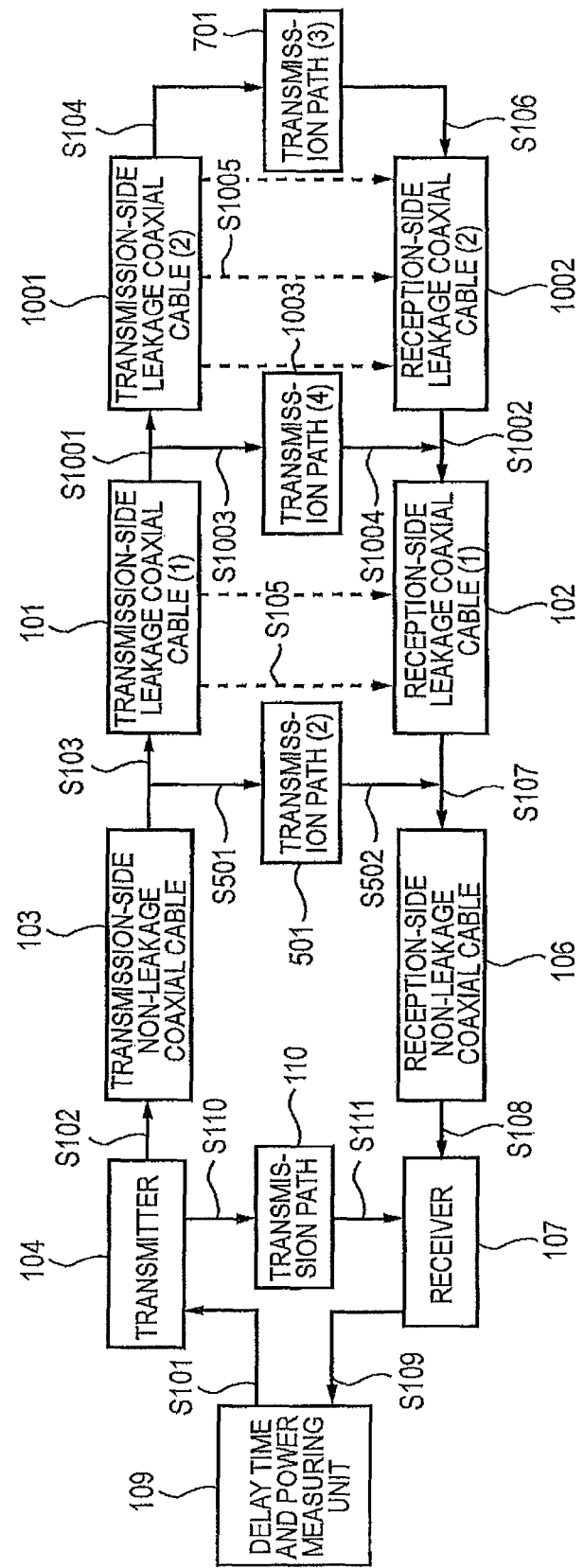
FIG. 10 is a diagram exemplifying another system construction of the obstacle detecting system according to a fourth embodiment of the present invention.

FIG. 10 is a block diagram showing the obstacle detecting device having the function shown in the fourth embodiment of the present invention.

In FIG. 10, the transmission-side leakage coaxial cable (1) 101 is the same as the transmission-side leakage coaxial cable 101 shown in FIGS. 1, 5 and 7, and the reception-side leakage coaxial cable (2) 102 is the same as the reception-side leakage coaxial cable 102 shown in FIGS. 1, 5 and 7. A transmission-side leakage coaxial cable (2) 1001 is disposed between the transmission side leakage coaxial cable (1) 101 and the transmission path (3) 701, and a reception-side leakage coaxial cable 1002 is disposed between the transmission path (3) 701 and the reception-side leakage coaxial cable 102. A transmission path (4) 1003 is a transmission path through which S1001 between the transmission-side leakage coaxial cable (1) 101 and the transmission-side leakage coaxial cable (2) 1001 is connected to S1002 between the reception-side leakage coaxial cable (1) 102 and the reception-side leakage coaxial cable (2) 1002. The other constituent elements are not different from those of FIG. 7, and thus the description thereof is omitted.

First, the grading will be described.

With respect to the transmission-side leakage coaxial cable of the obstacle detecting device, in order to broaden the monitoring district, it is normal that cables having different characteristics are used while connected to each other in series. As the feature of this cable, the amount of electrical waves to be emitted (hereinafter referred to as "radiation amount") and the attenuation amount of power with respect to the transmission distance (hereinafter referred to as "transmission loss") are in tradeoff relationship with each other, and thus it is impossible to increase the electrical wave to be emitted and transmit much power farther to the rear stage of the cable with only one cable. Therefore the grading is executed to implement both of "the electrical waves to be emitted are increased" and "much power is transmitted farther to the rear stage of the cable".

With respect to the construction when the grading is executed, it is necessary that the power of the incoming detection signal is large and much power is transmitted to the transmission-side leakage coaxial cable (1001 of FIG. 7) at the rear stage, a cable having a small emission amount and a small transmission loss is used as the transmission-side leakage coaxial cable (103 of FIG. 7) at the nearer side to the signal generating source. Next, a cable having a large emission amount and a large transmission loss is used as the transmission-side leakage coaxial cable (1001 of FIG. 7) at the farther side from the signal generating source because the power of the incoming detection signal is small and the power is not required to be transmitted beyond the transmission-side leakage coaxial cable concerned. According to the construction as described above, the distance at which the emission amount from the cable can be kept to some value or more can be lengthened, and the monitoring district can be broadened as compared with a case where one cable is used.

In the above construction, the transmission-side leakage coaxial cable is described. However, the same effect can be obtained by grading the reception-side leakage coaxial cable. Furthermore, the same effect can be obtained by grading the leakage coaxial cables at the transmission and reception sides.

In FIG. 10, the detection signal reaching the transmission-side leakage coaxial cable (1) 101 is split into a signal (S105) emitted as electrical waves from the transmission-side leakage coaxial cable (1) 101 and reaching the reception-side leakage coaxial cable (1) 102 for the obstacle detection, and a signal (S1001) transmitted to the transmission-side leakage coaxial cable (2) 1001 at the rear stage. The detection signal reaching the transmission-side leakage coaxial cable at the rear stage is split into a signal (S1005) emitted as electrical waves from the transmission-side leakage coaxial cable (2) 1001 and reaching the reception-side leakage coaxial cable (2) 1002 for the obstacle detection and a signal (S104) transmitted to the transmission path (3) to enhance the detection precision and detect an abnormal place as described above.

A part of the detection signal reaching the transmission-side leakage coaxial cable (2) 1001 at the rear stage reaches the transmission path (4) 1005. The detection signal (S1003, S1004) reaching the transmission path (4) 1005 passes from the reception-side leakage coaxial cable (1) 102 through the reception-side non-leakage coaxial cable (1) 106 to the receiver 107. The same signal 5108 reaching the receiver 107 passes through the constituent elements of the receiver and reaches the delay time and power measuring unit 109.

Accordingly, it is impossible to monitor the soundness of the reception-side leakage coaxial cable (1) 102 from the transmission-side leakage coaxial cable (1) 101 and monitor the soundness of the reception-side leakage coaxial cable (2) 1002 at the rear stage from the transmission-side leakage coaxial cable (2) 1001 at the rear stage.

Figure 11:
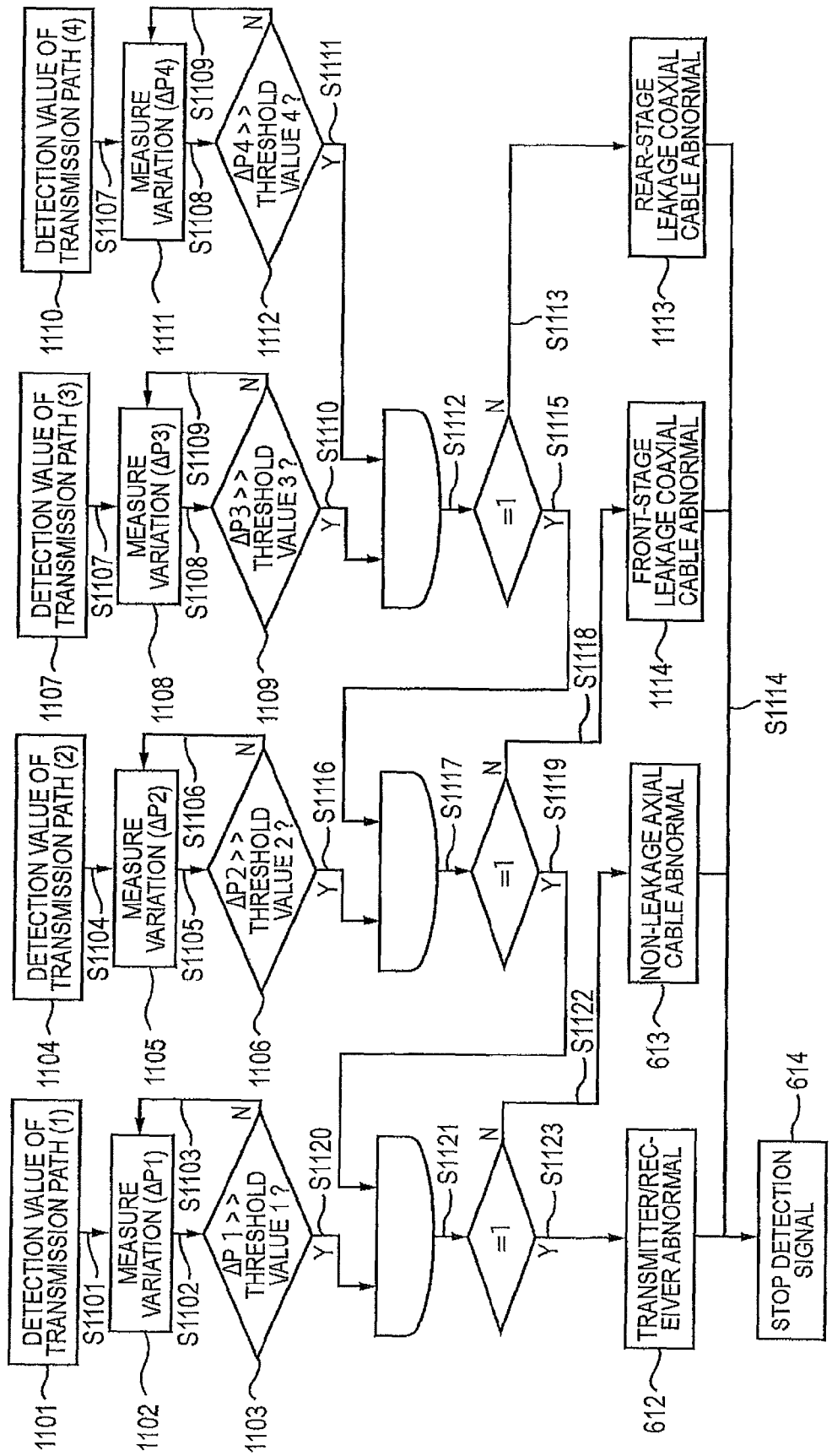
FIG. 11 is a flowchart exemplifying the operation flow of the fourth embodiment of the present invention.

FIG. 11 is a monitoring flowchart concerning detection of an abnormal place according to the fourth embodiment.

In FIG. 11, the monitoring flowchart contains a step of measuring the variation ($\Delta P1$) of a detection value 1101 of the transmission path (1) (1102) to determine whether $\Delta P1$ is larger than any threshold value 1 (1103), a step of measuring the variation ($\Delta P2$) of a detection value 1104 of the transmission path (2) (1105) to determine whether $\Delta P2$ is larger than any threshold value 2 (1106), a step of measuring the variation amount ($\Delta 23$) of a detection value 1107 of the transmission path (3) (1108) to determine whether $\Delta P3$ is larger than any threshold value 3 (1109), and a step of measuring the variation ($\Delta P4$) of a detection value 1110 of the transmission path (4) (1111) to determine whether $\Delta P4$ is larger than any threshold value 4 (1112).

When an abnormal place is detected, it is determined on the basis of which variation ($\Delta P1$, $\Delta P2$, $\Delta P3$, $\Delta P3$) exceeds the threshold value (threshold value 1, threshold value 2, threshold value 3, threshold value 4).

First, the product of S1110 and S1111 is calculated. When the calculation result is not equal to 1, it is determined that the abnormal place is the leakage coaxial cable at the rear stage. Subsequently, when the product of S1110 and S1111 is equal to 1, the product of S1115 and S1116 is calculated. When the calculation result is not equal to 1, the abnormal place is the leakage axial cable at the front stage. When the calculation result is equal to 1, the product of S1120 and the calculation result "1" is calculated. When the calculation result is not equal to 1, the abnormal place is the non-leakage coaxial cable, and when the calculation result is equal to 1, the abnormal place is the transmitter/receiver.

As described above, according to the construction shown in FIG. 10, even when the grading is executed, the temperature characteristic variation and the aged characteristic variation of the route from the transmission-side non-leakage coaxial cable 103 to the reception-side non-leakage coaxial cable 106 can be monitored and corrected, and also the soundness of the transmitter 104, the receiver 107, the transmission-side non-leakage coaxial cable 103, the reception-side non-leakage coaxial cable 106, the transmission-side leakage coaxial cable (1) 101, the transmission-side leakage coaxial cable (2) 1001, the reception-side leakage coaxial cable (1) 102 and the reception-side leakage coaxial cable (2) 1002 can be monitored. Accordingly, the risk that error detection or non-detection occurs can be eliminated, the maintenance at a short period is unnecessary and also the soundness of the obstacle detecting device be monitored.

Fifth Embodiment

In the fourth embodiment, the transmission paths are disposed between the transmitter 104 and the receiver 107 (the transmission path 110), between the transmission-side non-leakage coaxial cable 103 and the reception-side non-leakage coaxial cable 106 (the transmission path 501), between the terminating portion of the transmission-side leakage coaxial cable 101 and the reception-side leakage coaxial cable 102 (the transmission path 701), and between the transmission-side leakage coaxial cable and the grading place of the reception-side leakage coaxial cable (the transmission path 1003). However, the output of the transmission path 110 may be transmitted to the delay time and power measuring unit 109.

Figure 12:
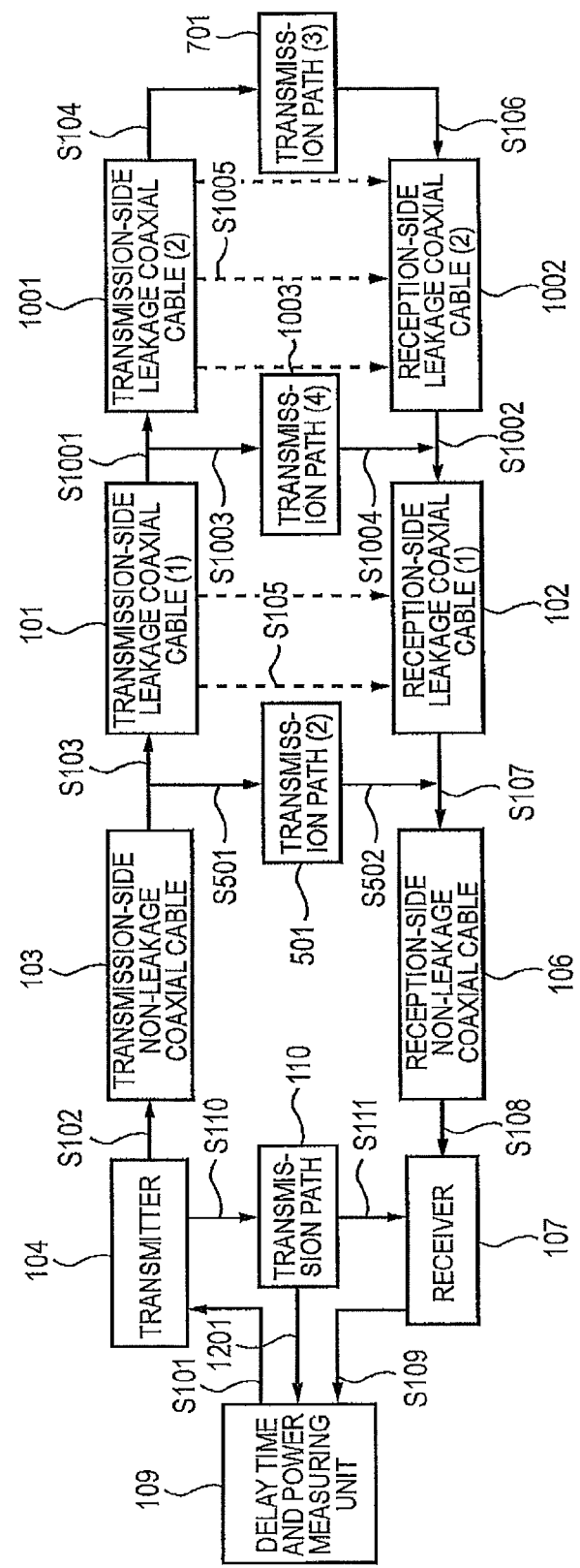
FIG. 12 is a diagram exemplifying another system construction of the obstacle detecting system according to a fifth embodiment of the present invention.

FIG. 12 is a block diagram showing the construction of the obstacle detecting device having the function according to a fifth embodiment of the present invention.

In FIG. 12, the output of the transmission path 110 is split into a signal S107 directing to the receiver 107, and a signal S1201 directing to the delay time and power measuring unit 109. The other constituent elements are identical to those shown in FIG. 1, and thus the description thereof is omitted.

When the basic operations of the transmitter 104 and the receiver 107 are diagnosed, it has been conventionally required to connect a power measuring unit (power meter or spectrum analyzer) to the tip of the transmitter 104 to measure the transmission output of the transmitter 104. Furthermore, when the basic operation of the receiver 107 is diagnosed, the transmitter 104 and the receiver 107 are connected to each other by an external transmission path, and the basic operation of the receiver 107 is diagnosed on the basis of the transmission output output from the transmitter 104.

In FIG. 12, the detection signal S110 passing from the transmitter 104 to the transmission path 110 is split into a signal subsequently passing to the receiver 107 (S111) and a signal subsequently passing to the delay time and power measuring unit 109 (S1201). The signal (S111) reaching the receiver 107 is used to monitor and correct the transmitter 104 and the receiver 107 as described above. However, by using the signal (S1201) reaching the delay time and power measuring unit, the transmitter 104 and the receiver 107 of the obstacle detecting device can be self-diagnosed.

Figure 13:
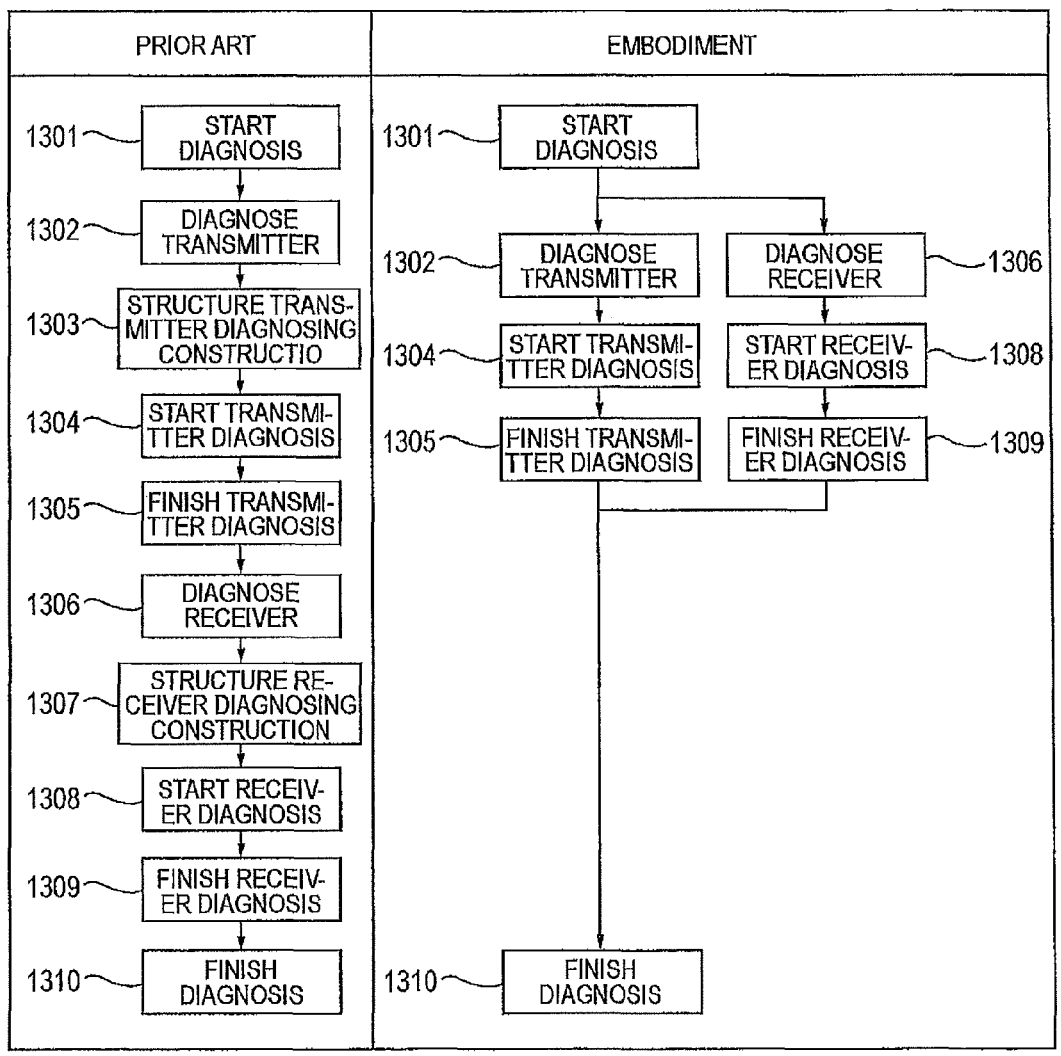
FIG. 13 is a flowchart exemplifying the operation flow of the fifth embodiment of the present invention in comparison with the operation flow of the conventional system.

FIG. 13 is a conventional basic operation diagnosing flowchart and a basic operation diagnosing flowchart of the fifth embodiment.

In FIG. 13, in the conventional basic operation diagnosing flowchart, when a transmitter diagnosis 1302 is executed upon start of a diagnosis (1301), a transmitter diagnosing construction for performing the transmitter diagnosis must be structured (1303). When the structuring of the transmitter diagnosis construction (1303) is finished, the transmitter diagnosis is started (1304). When the transmitter diagnosis is finished (1305), a receiver diagnosis (1306) is executed. In order to execute the receiver diagnosis 1306, a receiver diagnosing construction must be structured (1307) as in the case of the transmitter diagnosis. When the structuring of the receiver diagnosing construction (1307) is finished, the receiver diagnosis is started (1308). When the receiver diagnosis is finished (1309), all the basics operation diagnoses are finished (1310). Each of the basic operation diagnoses is automatically executed on the basis of a diagnosis program.

In the conventional basic operation diagnosis, the reception diagnosis must be executed after the transmitter diagnosis is executed, and additionally constituent elements other than the detecting device must be prepared in the structuring of the transmitter diagnosing construction (1303) and the receiver diagnosing construction (1307) and also the construction structuring must be manually performed.

Next, the basic operation diagnosing flow of this embodiment will be described.

When a diagnosis is started (1301), a transmitter diagnosis 1302 and a receiver diagnosis 1306 are executed in parallel. The transmitter diagnosis 1302 is started (1304), and the receiver diagnosis 1306 is started (1308). The transmitter diagnosis is finished (1305), and the receiver diagnosis is finished (1309), whereby all the basic operation diagnoses are finished (1310).

As described above, the basic operation diagnosis of this embodiment can perform the transmitter diagnosis 1302 and the receiver diagnosis 1306 at the same time. This is because the transmitter diagnosis based on S1201 and the receiver diagnosis based on 5111 can be performed because the transmission path 110 shown in FIG. 12 is provided, and also it is unnecessary to structure the test construction for the transmitter and the receiver at the outside.

Furthermore, the basic operation diagnosis according to this embodiment does not need any manual action. Accordingly, the error of the test construction and the load imposed on test personnel can be reduced.

As described above, according to the construction shown in FIG. 13, the basic operation diagnosis can be easily and surely performed at short times with a low load.

The first to fifth embodiments described above have the following features as described above.

Feature 1: An obstacle detecting device that is connected to leakage coaxial cables laid on in parallel at both the sides of an obstacle monitoring district, emits electrical waves from one of the leakage coaxial cables to the other leakage coaxial cable and detects an obstacle in the obstacle monitoring district on the basis of the electrical waves incident to the other leakage coaxial cable, comprises:

an electrical wave transmitting unit that is connected to one end of the one leakage coaxial cable and transmits as an electrical wave a signal which is subjected to spread spectrum modulation with a predetermined pseudonoise code;

an electrical wave receiving unit that is connected to one end of the other leakage coaxial cable and receives the electrical wave;

a detecting unit for measuring the power level of received electrical wave received by the electrical wave receiving unit, and detecting an obstacle in the obstacle monitoring district on the basis of the power level of the received electrical wave; and means for connecting the electrical wave transmitting unit and the electrical wave receiving unit (a transmission path for directly transmitting a signal from the transmitting unit (transmitter) to the receiving unit (receiver) (a transmission path which does not pass through both the leakage coaxial cables), wherein power is kept constant on the time axis from the arrival at the receiver from the transmitter till the arrival at a computing unit, thereby enhancing detection precision of the obstacle detecting device.

Feature 2: An obstacle detecting device that includes leakage coaxial cables laid on in parallel at both the sides of an obstacle monitoring district, emits electrical waves from one of the leakage coaxial cables to the other leakage coaxial cable and detects an obstacle in the obstacle monitoring district on the basis of the electrical waves incident to the other leakage coaxial cable, comprises:

an electrical wave transmitting unit that is connected to one end of the one leakage coaxial cable and transmits as an electrical wave a signal which is subjected to spread spectrum modulation with a predetermined pseudonoise code;

an electrical wave receiving unit that is connected to one end of the other leakage coaxial cable and receives the electrical wave;

a detecting unit for measuring the power level of received electrical wave received by the electrical wave receiving unit, and detecting an obstacle in the obstacle monitoring district on the basis of the power level of the received electrical wave; and means for connecting the electrical wave transmitting unit and the electrical wave receiving unit at the front stages of both the leakage coaxial cables.

Feature 3: An obstacle detecting device that includes leakage coaxial cables laid on in parallel at both the sides of an obstacle monitoring district, emits electrical waves from one of the leakage coaxial cables to the other leakage coaxial cable and detects an obstacle in the obstacle monitoring district on the basis of the electrical waves incident to the other leakage coaxial cable, comprises:

an electrical wave transmitting unit that is connected to one end of the one leakage coaxial cable and transmits as an electrical wave a signal which is subjected to spread spectrum modulation with a predetermined pseudonoise code;

an electrical wave receiving unit that is connected to one end of the other leakage coaxial cable and receives the electrical wave;

a detecting unit for measuring the power level of received electrical wave received by the electrical wave receiving unit, and detecting an obstacle in the obstacle monitoring district on the basis of the power level of the received electrical wave; and means for connecting the electrical wave transmitting unit and the electrical wave receiving unit at the rear stages of both the leakage coaxial cables.

Feature 4: An obstacle detecting device that includes leakage coaxial cables laid on in parallel at both the sides of an obstacle monitoring district, emits electrical waves from one of the leakage coaxial cables to the other leakage coaxial cable and detects an obstacle in the obstacle monitoring district on the basis of the electrical waves incident to the other leakage coaxial cable, comprises:

an electrical wave transmitting unit that is connected to one end of the one leakage coaxial cable and transmits as an electrical wave a signal which is subjected to spread spectrum modulation with a predetermined pseudonoise code;

an electrical wave receiving unit that is connected to one end of the other leakage coaxial cable and receives the electrical wave;

a detecting unit for measuring the power level of received electrical wave received by the electrical wave receiving unit, and detecting an obstacle in the obstacle monitoring district on the basis of the power level of the received electrical wave; and means for connecting the electrical wave transmitting unit and the electrical wave receiving unit at the front and rear stages of both the leakage coaxial cables.

Feature 5: An obstacle detecting device that includes leakage coaxial cables laid on in parallel at both the sides of an obstacle monitoring district, emits electrical waves from one of the leakage coaxial cables to the other leakage coaxial cable and detects an obstacle in the obstacle monitoring district on the basis of the electrical waves incident to the other leakage coaxial cable, comprises:

an electrical wave transmitting unit that is connected to one end of the one leakage coaxial cable and transmits as an electrical wave a signal which is subjected to spread spectrum modulation with a predetermined pseudonoise code;

an electrical wave receiving unit that is connected to one end of the other leakage coaxial cable and receives the electrical wave;

a detecting unit for measuring the power level of received electrical wave received by the electrical wave receiving unit, and detecting an obstacle in the obstacle monitoring district on the basis of the power level of the received electrical wave;

means for connecting the electrical wave transmitting unit and the electrical wave receiving unit at the front and rear stages of both the leakage coaxial cables; and means for connecting the electrical wave transmitting unit and the electrical wave receiving unit at the intermediate stages of both the leakage coaxial cables.

Feature 6: An obstacle detecting device that includes leakage coaxial cables laid on in parallel at both the sides of an obstacle monitoring district, emits electrical waves from one of the leakage coaxial cables to the other leakage coaxial cable and detects an obstacle in the obstacle monitoring district on the basis of the electrical waves incident to the other leakage coaxial cable, comprises:

an electrical wave transmitting unit that is connected to one end of the one leakage coaxial cable and transmits as an electrical wave a signal which is subjected to spread spectrum modulation with a predetermined pseudonoise code;

an electrical wave receiving unit that is connected to one end of the other leakage coaxial cable and receives the electrical wave;

a detecting unit for measuring the power level of received electrical wave received by the electrical wave receiving unit, and detecting an obstacle in the obstacle monitoring district on the basis of the power level of the received electrical wave;

means for connecting the electrical wave transmitting unit and the electrical wave receiving unit; and means for detecting at the electrical wave transmitting unit.

Various modifications and alterations of this invention will be apparent to those skilled in the art without departing from the scope and spirit of this invention, and it should be understood that this is not limited to the illustrative embodiments set forth herein.

What is claimed is:

1. An obstacle detecting system having
leakage coaxial cables laid at both the sides of an obstacle monitoring district;
an obstacle detecting device for (i) emitting electrical waves from one of the leakage coaxial cables laid at one side to the other leakage coaxial cable and (ii) detecting an obstacle in the obstacle monitoring district on the basis of the electrical waves incident to the other leakage coaxial cable;
an electrical wave transmitting unit for transmitting the electrical waves to the one leakage coaxial cable in the obstacle detecting device;
an electrical wave receiving unit for receiving the electrical waves incident to the other leakage coaxial cable; and
a connecting unit for connecting the electrical wave transmitting unit and the electrical wave receiving unit, wherein
the obstacle detecting device (i) detects an output level of the electrical wave transmitting unit on a basis of the electrical wave passing through the connecting unit and (ii) corrects the output of the electrical wave transmitting unit.

2. The obstacle detecting system according to claim 1, wherein the obstacle detecting device corrects the output of the electrical wave transmitting unit to a predetermined level.

3. The obstacle detecting system according to claim 2, further comprising a connecting unit for connecting the one leakage coaxial cable and the other leakage coaxial cable at a side nearer to the obstacle detecting device.

4. The obstacle detecting system according to claim 3, further comprising a connecting unit for connecting the one leakage coaxial cable and the other leakage coaxial cable at a side farther from the obstacle detecting device.

5. The obstacle detecting system according to claim 4, further comprising a connecting unit for connecting the one leakage coaxial cable and the other leakage coaxial cable at an intermediate portion therebetween.

6. The obstacle detecting system according to claim 1, further comprising a connecting unit for connecting the one leakage coaxial cable and the other leakage coaxial cable at a side nearer to the obstacle detecting device.

7. The obstacle detecting system according to claim 6, further comprising a connecting unit for connecting the one leakage coaxial cable and the other leakage coaxial cable at a side farther from the obstacle detecting device.

8. The obstacle detecting system according to claim 7, further comprising a connecting unit for connecting the one leakage coaxial cable and the other leakage coaxial cable at an intermediate portion therebetween.

9. An obstacle detecting device for emitting electrical waves from one leakage coaxial cable laid at one side of an obstacle monitoring district to another leakage coaxial cable laid at another side of the obstacle monitoring district and detecting an obstacle in the obstacle monitoring district on the basis of the electrical waves incident to the other leakage coaxial cable, comprising:
a connecting unit for connecting an electrical wave transmitting unit for transmitting the electrical waves to the one leakage coaxial cable in the obstacle detecting device and an electrical wave receiving unit for receiving the electrical waves incident to the other leakage coaxial cable in the obstacle detecting device, wherein
the obstacle detecting device detects an output level of the electric wave transmitting unit on a basis of the electric wave passing through the connecting unit and corrects the output of the electric wave transmitting unit to a predetermined level.

\* \* \* \* \*